Feb. 13, 1968   S. J. RAITERI   3,368,477
COFFEE MAKERS
Filed Sept. 14, 1965   2 Sheets-Sheet 2
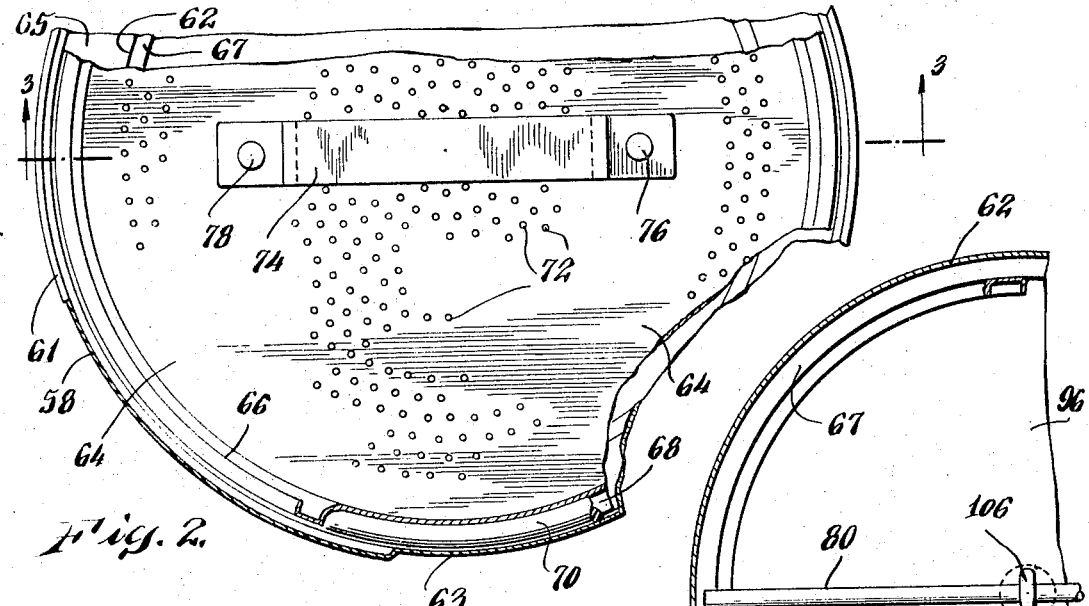
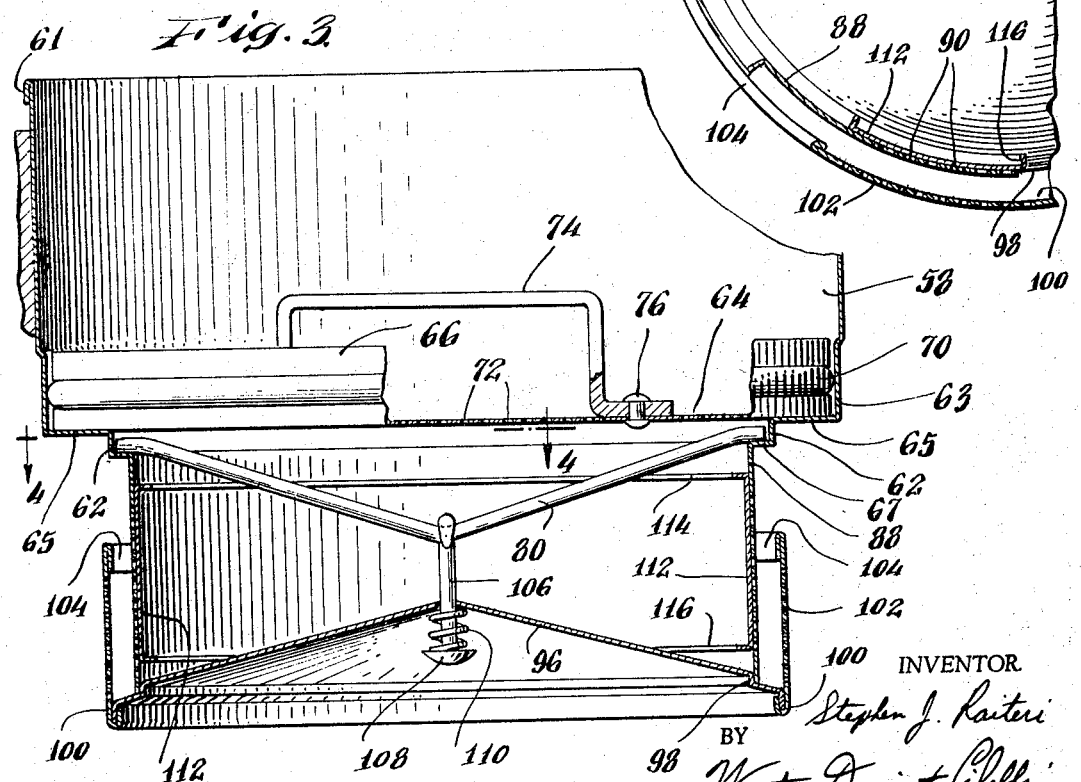
INVENTOR.
Stephen J. Raiteri
BY
Wooster, Davis & Cifelli
attys.

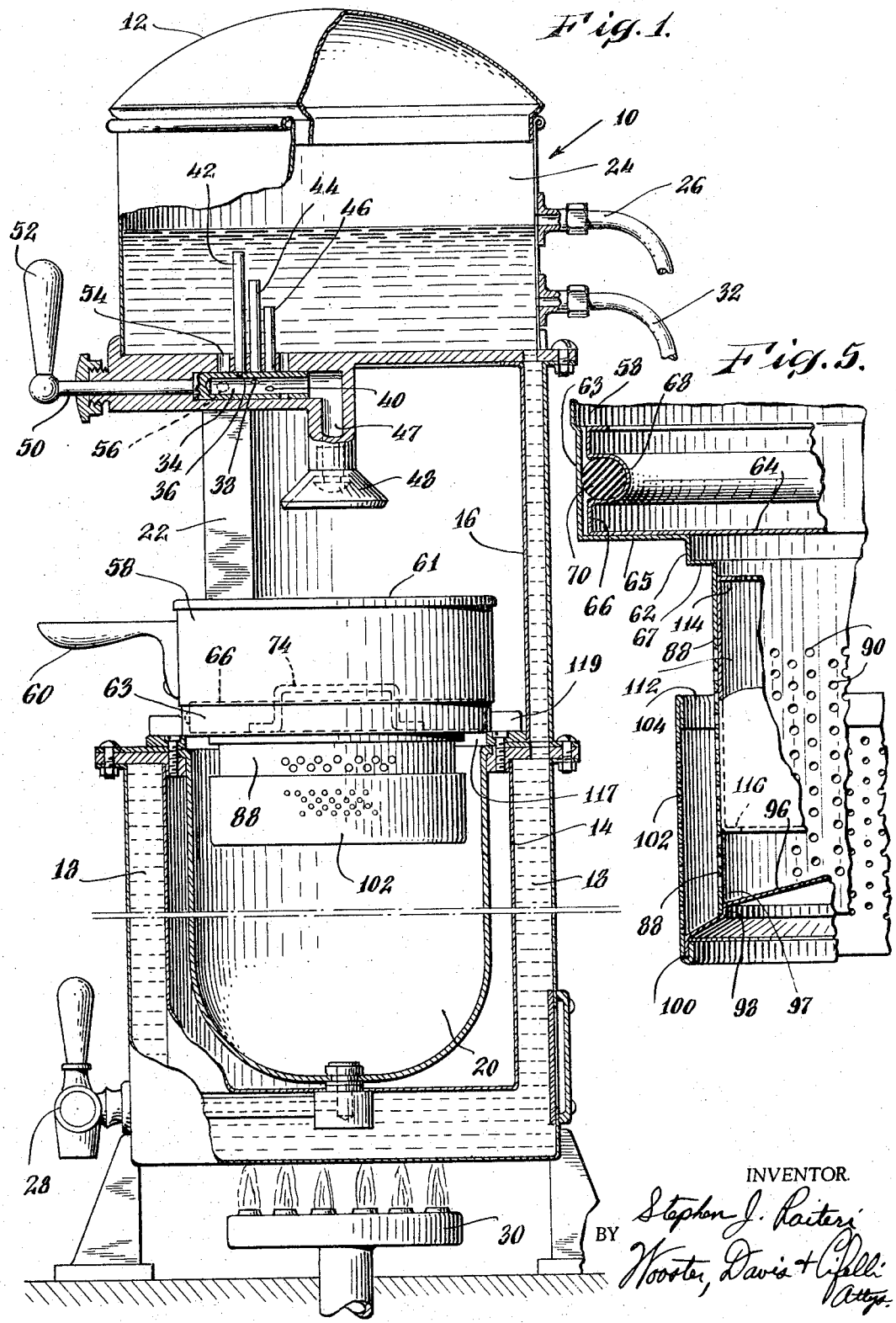

United States Patent Office 3,368,477
Patented Feb. 13, 1968

3,368,477
COFFEE MAKERS
Stephen J. Raiteri, Webbs Hill Road,
Stamford, Conn. 06903
Filed Sept. 14, 1965, Ser. No. 487,290
3 Claims. (Cl. 99—298)

ABSTRACT OF THE DISCLOSURE

A drip type coffee maker including an upper hot water chamber and a lower coffee receptacle. A strainer assembly intermediate the chamber and receptacle comprises an imperforate conical base upon which are concentrically mounted a pair of perforated, spaced, cylindrical strainers. The inner strainer holds the ground coffee and its perforations are sufficiently large to achieve the desired water flow rate. The flow rate may be additionally controlled by an imperforate cylindrical insert in the inner chamber. The outer strainer is finely perforated to remove the fines from the brewed coffee.

---

This invention relates to improvements in coffee makers and, more particularly, to an improved filter for use therein.

The coffee and restaurant industries have long been engaged in research directed to discovering the best method for brewing coffee. Various methods and various devices for accomplishing these methods have been developed. The best methods known to date are percolation, the vacuum method, and the drip method. Percolation achieves fairly good results if the process is not continued for too long a time; however, it has the objection of recirculating the water through the coffee grounds. The vacuum method also achieves fair results, but has the objection that as the water is forced upward through the grounds it breaks up the filter bed formed by these grounds. For maximum flavor and brewing efficiency, there should be a filter bed at least one inch thick formed by the coffee grounds. For these reasons, the drip method, wherein hot water is applied directly to the upper surface of a filter bed of coffee grounds and allowed to make a single pass downward, is the preferred method. Coffee industry experts recommend that hot water not be in contact with the grounds longer than six minutes. This length of time allows the extraction of maximum flavor without bitterness. It will also be obvious, of course, that for purposes of economy, each unit volume of coffee should be contacted by the hot water for approximately the same length of time. It is also important to adequately filter the brewed coffee. The ground coffee itself serves as one filter bed; however, the fines which are present must also be removed, and this is not adequately accomplished by the coffee bed.

Various types of filters have been employed in the prior art coffee makers with varying degrees of success. However, none of these filters have proved completely satisfactory for a number of reasons. For example, as stated above, the fines contained in ground coffee should be removed by filtration prior to serving. For this purpose a fine filter is desirable. However, when a fine filter is used to support the ground coffee bed it also prevents the water from passing through at an adequate rate of speed. This causes bitterness, as has been pointed out above. Additionally, many of the prior art filters are very difficult to clean. For example, a wire mesh filter screen is objectionable because of difficult cleaning and because it tends to retain grounds which can then become rancid. The same objection may be stated as to cloth screens and bags. While paper bags and filters are disposable and thereby resolve the cleaning problem, filtration is too slow with such devices. For these reasons the best type of filter is perforated sheet metal as this can be more thoroughly cleaned. Since a coarse filter is desired to permit adequate water flow and a fine filter is desired to clarify the beverage, it is difficult to strike a proper balance between these two conflicting results.

It is, therefore, the primary object of this invention to provide an improved filter for drip-type coffee making apparatus.

Other objects are to provide such a filter which allows adequately rapid transmission of water through the coffee, which filters the fines from the brewed coffee, and which is easily cleaned.

Other objects, features and advantages of this invention will be apparent from the following description, the appended claims and the figures of the attached drawings, wherein:

FIG. 1 is a cross sectional view of an urn-type coffee maker with the filter of this invention shown in elevation;

FIG. 2 is a plan view of the water distributing portion of this invention shown partially cut away;

FIG. 3 is a cross section taken along the line 3—3 of FIG. 2;

FIG. 4 is a partial cross section taken along the line 4—4 of FIG. 3, and

FIG. 5 is a partial cross sectional view of the filter of this invention shown in enlarged form to more adequately indicate its construction.

In FIG. 1 there is illustrated a coffee urn 10 which is of generally cylindrical form. The urn 10 is closed at the top by a suitable removable cover 12. The lower portion of urn 10 includes a generally cylindrical lower inner wall 14 connecting to a central inner wall 16. Together with the outer wall of urn 10 the lower inner wall 14 forms a water space 18 which encircles an inner coffee container 20 which may be of any suitable material such as metal or glass. The central inner wall 16 and the adjacent outer wall of urn 10 extend only approximately three-quarters of the way around the circumference of the urn, thus defining an opening 22 for insertion and removal of the filter. Opening 22 may be closed by a sliding door (not shown) having provision for the extending handle 60 of the filter. The entire upper portion of urn 10 forms a cylindrical water storage space 24. An overflow 26 controls the amount of water in storage space 24. A suitable spigot 28 is connected to drain coffee from container 20. A heater, such as a gas burner 30, may be provided for keeping the water and coffee at the proper temperature. Additional water may be admitted to the urn through a water inlet 32. In making coffee by the drip method, a measured amount of water must be added to the coffee grounds. In the embodiment illustrated in FIG. 1, this is accomplished by means of a metering valve which comprises a rotatable cylinder 34 having four radial openings 56, 36, 38, 40 therein. These radial openings are circumferentially spaced about the cylinder 34 so that they may each be separately aligned with a separate passage into storage space 24. In the illustration, opening 36 is aligned with standpipe 42 and the valve is thus in a position to allow the water level to drop from the illustrated level to the top of the standpipe 42 and pass through passageway 47 into the water discharge sprinkler head 48. A middle standpipe 44 is positioned for alignment with radial opening 38 and a low level standpipe 46 is positioned for alignment with radial opening 40. The cylinder 34 may be rotated by a control shaft 50 and a selector handle 52 to any of the three positions or to an "off" position. In addition, the entire water storage space 24 may be completely drained by means of drain passage 54 and radial opening 56. The heights of the standpipes 42, 44, 46 are selected to allow a measured amount of water to flow from storage space 24 into the sprinkler head 48. The configuration of sprinkler head 48 is not critical to this invention. It is provided merely to distribute the water in a fairly diffused manner into the filter of the invention which will now be described.

A substantially cylindrical water receiving vessel 58 is removably positioned beneath sprinkler head 48. A handle 60 is connected to the side of the vessel and is allowed to protrude through the opening 22 in the side of the urn. Vessel 58 is substantially cylindrical in form and is open at both ends. An annular rim 61 encircles its upper edge and its sides are decreased in size to form a shallow annular recess 63, an annular ledge 65, a lip 62, a second ledge 67 and a dependent cylindrical strainer 88. Across vessel 58, positioned on ledge 65, is a water distributing plate 64 which is essentially disc-shaped and has around its periphery an upright rim 66. Rim 66 includes an annular recess 68 which is designed to receive a resilient gasket 70. The juncture between gasket 70 and the wall of recess 63 prevents the leakage of water therebetween. A plurality of water distributing perforations 72 are provided in distributing plate 64. A handle 74 is riveted to distributing plate 64 by suitable rivets 76, 78 to allow for its easy removal from vessel 58. A support bar 80 spans the reduced diameter of vessel 58, its two ends resting on diametrically opposite portions of ledge 67.

Strainer 88 is provided with perforations 90 around its circumference and its lower end is enclosed by a conical imperforate base 96 which is designed with its apex upward and includes an annular shelf 98 which fits inside the lower edge of the strainer 88. The extreme outer periphery of conical base 96 terminates in an annular rim 100 which is permanently attached to the lower edge of a cylindrical filter 102. Filter 102 encircles strainer 88 and is concentric with it. It is essentially free standing and, therefore, is strengthened by a turned-down rim 104 on its upper edge. The entire filter assembly may be held together by means of a hook 106 which extends upward from a hole provided in the apex of conical base 96. The lower end of hook 106 terminates in an enlarged head 108 and a compression coil spring 110 extends between base 96 and head 108. By this arrangement the elements of the filter may be rigidly but removably secured by engaging hook 106 with support bar 80. As an additional feature of this invention there is provided within the strainer 88 a slidable, imperforate, cylindrical insert 112. Insert 112 is open at each end but is provided with internally extending annular rims 114, 116. Insert 112 is in close fitting slidable relationship with the strainer 88 and thus provides a valve for varying the rate of flow of water through the coffee grounds to conform to the amount of coffee being made.

The assembly of this device may now be envisioned by beginning with conical base 96 and filter 102. The lower edge of the strainer 88 is then positioned around the shelf 98. If the insert 112 is to be employed, it may be inserted within strainer 88 either before or after assembling to the base 96. The base 96, together with the filter 102, may now be connected to the lower portion of strainer 88 and to water-receiving vessel 58 by engaging hook 106 with support bar 80. A measured amount of ground coffee is then placed on the top of base 96 and within the strainer 88. It is to be understood that, although the perforations in strainer 88 are shown enlarged for purposes of clarity, they are in fact small enough to retain the coffee within the confines of its cylindrical shape. In one example, the perforations in strainer 88 are .0625 inch in diameter and those in filter 102 are .020 inch. The distributing plate 64 is next placed in position by means of handle 74 and is depressed so that gasket 70 fits closely against the inside wall of the shallow recess 63. The entire assembly is then positioned beneath sprinkler head 48 and over the upper opening of coffee container 20, as illustrated most clearly in FIG. 1. As will be seen, the annular ledge 65 is supported directly by a flange 117 contained within the urn, and proper positioning is provided by suitable stops 119.

In brewing coffee, a desired amount of hot water is introduced into the water-receiving vessel 58. This may be accomplished, for example, by rotation of selector handle 52 to the desired position and the consequent discharge of a measured amount of water through one of the standpipes 42, 44 or 46 into the sprinkler head 48. Water from this head passes directly into the receiving vessel 58 and lies on the distributing plate 64 while it gradually passes through the distributing perforations 72. Water dripping from perforations 72 alights directly on the ground coffee bed supported by conical base 96. The configuration of the conical base and the supported bed results in the efficient radial passage of hot water through the bed and through the strainer 88. The insert 112, if used, will have been initially set at a height which will allow the proper flow rate of water through the coffee. The proper height for this insert may be marked, for example, on the inner side of the strainer 88 for convenience of the operator. After passage through the strainer 88 which supports the side of the coffee bed, the newly brewed coffee passes through the fine filter 102. Due to the geometry of the radial movement of water through concentric circular filters, it will be noted that the area of the final filter surface is greater than the area of the first filter. In this way, the fine filter is caused to perform its efficient filtering action without affecting the length of time the hot water is maintained in contact with the ground coffee. It will also be noted, by inspection of FIG. 5, that the lowermost perforations in strainer 88 lie above the level of base 96. This provides an important advantage in that an annular sediment trap 97 is formed which accomplishes an initial clarification of the brewed coffee.

It will be seen that in this apparatus new advantages are combined with the many advantages achieved by various prior art apparatus without the introduction of new disadvantages. The actual brewing time of the coffee, for example, may be kept at any desired length of time, for example, under six minutes. At the same time, however, its is not necessary to sacrifice the fine filtering action which is desirable for clear coffee. Furthermore, the entire assembly may be constructed of sheet metal which is easily cleaned and the components may be disassembled for cleaning purposes but easily reassembled for use.

The many advantages of this invention will be immediately apparent to those skilled in the art. It will also be apparent that many modifications and variations of this invention are possible without departing from the spirit and scope thereof. Accordingly, the foregoing description is to be construed as illustrative only, rather than limiting. This invention is limited only by the scope of the following claims.

What I claim as new and desire to secure by Letters Patent of the United States is:

1. In a coffee urn wherein hot water is caused to pass downwardly and sequentially through a bed of ground coffee, a filter, and into a coffee container, the improvement wherein said filter comprises: inner and outer separable strainer elements, each of said elements comprising an open-ended cylindrical metallic sheet defining a plurality of perforations therein, the perforations of said inner element being larger than the perforations of said outer element, said inner and outer elements being positioned, respectively, in first and second flow passage relationship to water flow from said bed to said container; a substantially imperforate insert adjustably positions in flow blocking relationship with said inner element to control the passage of water therethrough; and a concave imperforate base member closing the lower open ends of both of said strainer elements.

2. The improvement of claim 1 wherein said insert is substantially cylindrical and telescopically slidable within said inner element.

3. A filter basket for a coffee maker comprising: a water distributing vessel having a substantially cylindrical imperforate side wall and a substantially planar base perforated for the passage of water therethrough; a depending cylindrical perforated first filter encircling the perforations in said base; a substantially cylindrical imperforate valve insert telescopically slidable on said first filter; a substantially cylindrical perforated second filter encircling and concentric with said first filter and spaced therefrom; and an imperforate concave base member closing the lower ends of said first and second filters.

References Cited

UNITED STATES PATENTS

| 394,046 | 12/1888 | Wilson | 99—299 |
| 495,937 | 4/1893 | Green | 99—298 |
| 948,108 | 2/1910 | Edtbauer | 99—306 X |
| 1,357,051 | 10/1920 | Heinrichs | 99—322 |
| 1,769,729 | 7/1930 | Wentorf | 99—299 |
| 2,111,777 | 3/1938 | Hois | 99—306 |
| 2,780,162 | 2/1957 | Chaplik | 99—306 |
| 2,638,839 | 5/1953 | Raiteri | 99—283 |

WALTER A. SCHEEL, *Primary Examiner.*

J. M. NEARY, *Assistant Examiner.*